(12) United States Patent
Chowdhury et al.

(10) Patent No.: US 12,539,070 B2
(45) Date of Patent: Feb. 3, 2026

(54) PERCEPTRON-BASED EMG PROCESSOR FOR NEUROPATHY AND MYOPATHY DIAGNOSIS

(71) Applicant: City University of Hong Kong, Hong Kong (HK)

(72) Inventors: Mehdi Hasan Chowdhury, Hong Kong (HK); Ray Chak Chung Cheung, Hong Kong (HK); Muhammad Irfan, Peshawar (PK); Abdurrashid Ibrahim Sanka, Hong Kong (HK); Siu Ying Patrick Hung, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 1014 days.

(21) Appl. No.: 17/482,479

(22) Filed: Sep. 23, 2021

(65) Prior Publication Data
US 2023/0091320 A1    Mar. 23, 2023

(51) Int. Cl.
*G16H 50/20*    (2018.01)
*A61B 5/00*    (2006.01)
(Continued)

(52) U.S. Cl.
CPC ............ *A61B 5/389* (2021.01); *A61B 5/7264* (2013.01); *G16H 50/20* (2018.01); *G16H 50/70* (2018.01)

(58) Field of Classification Search
CPC ....... A61B 5/389; A61B 5/7264; A61B 5/397; A61B 5/7267; G16H 50/20; G16H 50/70
See application file for complete search history.

(56) References Cited

U.S. PATENT DOCUMENTS

| | | | |
|---|---|---|---|
| 2016/0235326 A1 | 8/2016 | Cheng et al. | |
| 2020/0365229 A1* | 11/2020 | Fields | G06F 16/285 |
| 2021/0125057 A1* | 4/2021 | Choi | G06N 3/04 |

FOREIGN PATENT DOCUMENTS

| | | |
|---|---|---|
| CN | 103169472 A | 6/2013 |
| CN | 107427251 A | 12/2017 |
| KR | 102123149 B | 6/2020 |

OTHER PUBLICATIONS

A. Subasi, "Medical decision support system for diagnosis of neuromuscular disorders using DWT and fuzzy support vector machines," Computers in Biology and Medicine, vol. 42, No. 8, pp. 806-815, 2012.

(Continued)

*Primary Examiner* — Kc Chen
(74) *Attorney, Agent, or Firm* — Idea Intellectual Limited; Sam T. Yip

(57) ABSTRACT

The present invention provides a hardware-friendly framework for implementing a point-of-care diagnosis hardware tool for practical end-user convenience, power saving and resource utilization. The hardware tool is non-invasive and comfortable for the patient, as a primary means of differential diagnosis between two neuromuscular diseases such as neuropathy and myopathy. The provided hard-ware tool comprises a feature extractor configured to receive electrodiagnostic signals (preferably EMG signals) of a patient and extract one or more features from the collected signals; and a classifier configured to receive the extracted features and classify a neuromuscular disease for the patient based on the extracted features. The classifier is a single layer machine-learning perceptron trained with datasets consisted of electrodiagnostic signals of patients to perform a linearly separable binary classification.

6 Claims, 8 Drawing Sheets

(51) Int. Cl.
A61B 5/389 (2021.01)
G16H 50/70 (2018.01)

(56) References Cited

OTHER PUBLICATIONS

S. Lahmiri and M. Boukadoum, "Improved electromyography signal modeling for myopathy detection," in IEEE International Symposium on Circuits and Systems. IEEE, 2018, pp. 1-4.

S. A. Fattah, A. Doulah, M. Jumana, and M. A. Iqbal, "Evaluation of different time and frequency domain features of motor neuron and musculoskeletal diseases," International Journal of Computer Applications, vol. 43, No. 23, pp. 34-40, 2012.

P. Artameeyanant, S. Sultornsanee, and K. Chamnongthai, "An EMG-based feature extraction method using a hormalized weight vertical visibility algorithm for myopathy and neuropathy detection," SpringerPlus, vol. 5, No. 1, pp. 1-26, 2016.

A. S. U. Doulah, S. A. Fattah, W.-P. Zhu, and M. O. Ahmad, "Wavelet domain feature extraction scheme based on dominant motor unit action potential of EMG signal for neuromuscular disease classification," IEEE transactions on Biomedical Circuits and Systems, vol. 8, No. 2, pp. 155-164, 2014.

M. U. Khan, S. Aziz, M. Bilal, and M. B. Aamir, "Classification of EMG signals for assessment of neuromuscular disorder using empirical mode decomposition and logistic regression," in International Conference on Applied and Engineering Mathematics. IEEE, 2019, pp. 237-243.

H. Hasni, N. Yahya, V. S. Asirvadam, and M. A. Jatoi, "Analysis of electromyogram (EMG) for detection of neuromuscular disorders," in International Conference on Intelligent and Advanced System. IEEE, 2018, pp. 1-6.

A. Singh, M. K. Dutta, and C. M. Travieso, "Analysis of EMG signals for automated diagnosis of myopathy," in International Conference on Electrical, Computer and Electronics. IEEE, 2017, pp. 628-631.

R. Istenic, P. A. Kaplanis, C. S. Pattichis, and D. Zazula, "Multiscale entropy-based approach to automated surface EMG classification of neuromuscular disorders," Medical and Biological Engineering and Computing, vol. 48, No. 8, pp. 773-781, 2010.

S. Chatterjee, K. Samanta, N. R. Choudhury, and R. Bose, "Detection of myopathy and als electromyograms employing modified window stockwell transform," IEEE Sensors Letters, vol. 3, No. 7, pp. 1-4, 2019.

S. S. Roy, K. Samanta, S. Modak, S. Chatterjee, and R. Bose, "Cross spectrum aided deep feature extraction based neuromuscular disease detection framework," IEEE Sensors Letters, vol. 4, No. 6, pp. 1-4, 2020.

N. S. Anand and D. Chad, "Electrophysiology of myopathy," in The Clinical Neurophysiology Primer. Springer, 2007, pp. 325-351.

J. M. Bilbao and R. E. Schmidt, "Peripheral neuropathy and the role of nerve biopsy," in Biopsy Diagnosis of Peripheral Neuropathy. Springer, 2015, pp. 1-20.

D. Hilton-Jones, M. Turner, and M. R. Turner, Oxford textbook of neuromuscular disorders. Oxford Textbooks in Clinical N, 2014.

B. Katirji, H. J. Kaminski, and R. L. Ruff, Neuromuscular disorders in clinical practice. Springer Science & Business Media, 2013.

M. H. Chowdhury and R. C. C. Cheung, "Point-of-care EMG processor for the differential diagnosis of neuropathy and myopathy," in IEEE EMB Special Topic Conference on Healthcare Innovations and Point-of-Care Technologies, 2019.

S. Kim and G. C. Deka, Hardware Accelerator Systems for Artificial Intelligence and Machine Learning. Elsevier, 2021, vol. 122.

Y. S. Abu-Mostafa, M. Magdon-Ismail, and H.-T. Lin, Learning from data. AMLBook New York, NY, USA:, 2012, vol. 4.

M. Nikolic, "Detailed analysis of clinical electromyography signals: Emg decomposition, findings and firing pattern analysis in controls and patients with myopathy and amytrophic lateral sclerosis," Ph.D. dissertation, University of Cophenhagen, Aug. 2001. [Online]. Available: http://www.emglab.net/.

* cited by examiner

PERCEPTRON-BASED EMG PROCESSOR FOR NEUROPATHY AND MYOPATHY DIAGNOSIS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to method and device for diagnosis of neuromuscular diseases, more specifically, method and device for diagnosis of neuromuscular diseases based on electromyography (EMG) signals.

BACKGROUND OF THE INVENTION

Traditional diagnosis procedure of neuromuscular diseases consists of assessing comprehensive medical history, physical exam to test muscle strength, neurological exam to test reflex and coordination, ultrasound imaging, magnetic resonance imaging (MRI), electrodiagnostic assessment (EDX), such as nerve conduction study (NCS) and EMG, nerve sensitivity test and muscle biopsy. The thorough diagnosis procedure ensures detecting the underlying disease to prescribe a personalized treatment plan for an individual patient. However, symptoms of some neuromuscular diseases are quite similar. For instances, general symptoms of myopathy include muscle weakness, numbness, whereas primary symptoms of neuropathy are somewhat similar to those of myopathy, which include muscle weakness, numbness, pain, and tingling sensation in the affected body areas. Therefore, it often requires exceedingly long and extensive tests to pinpoint the exact illness.

Some works have been conducted to classify neuromuscular diseases based on EMG signals. FIGS. 1A-1C show EMG records from a healthy, myopathic and neuropathic test cases, respectively. Pathophysiologically, myopathy disrupts the structural integrity of the muscle cells and damages its metabolic process. As a result, the affected cells shrink or expire, weakening the overall muscle action potential. Hence, the peak-to-peak magnitude of the acquired EMG from a myopathy patient becomes considerably lower than usual (FIG. 1B). As for a neuropathy patient, even though the peripheral nerves are degraded, the muscle tissue remains functional. Furthermore, as the nerve cell diminishes, additional muscle cells occupy the vacant place. As a results, the EMG from a neuropathy patient is also different from a healthy person and has a relatively high amplitude (FIG. 1C).

Existing approaches are implemented at the software level, thus there is a lack of hardware-implemented neuromuscular disease classification system to provide a point-of-care diagnosis hardware tool which is non-invasive and comfortable for the patient.

SUMMARY OF THE INVENTION

One objective of the present invention is to provide a point-of-care diagnosis hardware tool, which is non-invasive and comfortable for the patient, as a primary means of differential diagnosis between two neuromuscular diseases such as neuropathy and myopathy. Another objective of the present invention is to provide a hardware-friendly framework for implementing the hardware tool for practical end-user convenience, power saving and resource utilization.

According to one aspect, the hard-ware tool provided by the present invention comprises a feature extractor configured to receive electrodiagnostic signals of a patient and extract one or more features from the electrodiagnostic signals; and a classifier configured to receive the extracted features and classify a neuromuscular disease for the patient based on the extracted features. The classifier is a single layer machine-learning perceptron trained with datasets consisted of electrodiagnostic signals of patients to perform a linearly separable binary classification based a hypothesis function.

BRIEF DESCRIPTION OF THE DRAWINGS

Embodiments of the invention are described in more detail hereinafter with reference to the drawings, in which.

DETAILED DESCRIPTION

In the following description, a processor for detection of neuromuscular diseases is set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
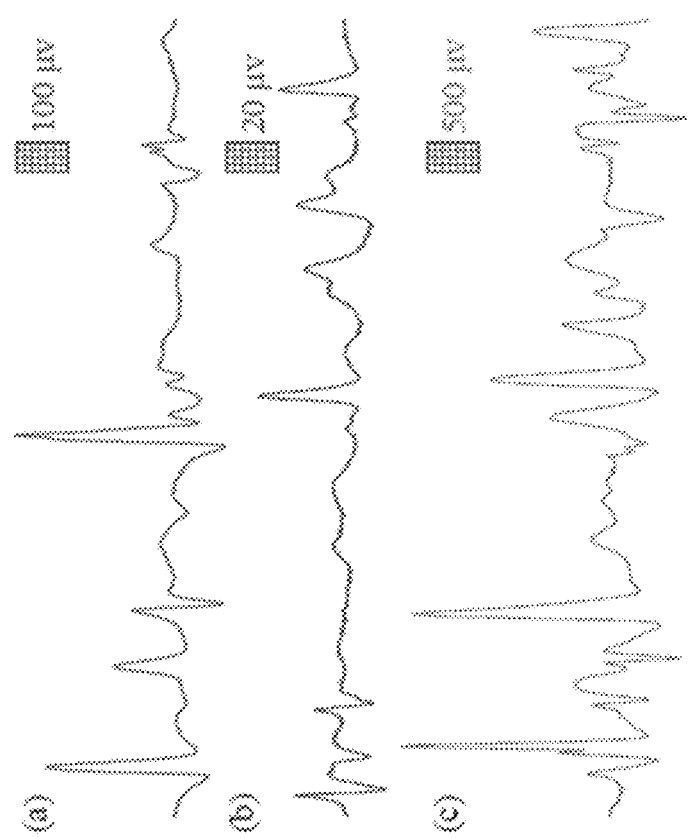
FIGS. 1A-1C show EMG records from a healthy, myopathic and neuropathic test cases, respectively.
Figure 2:
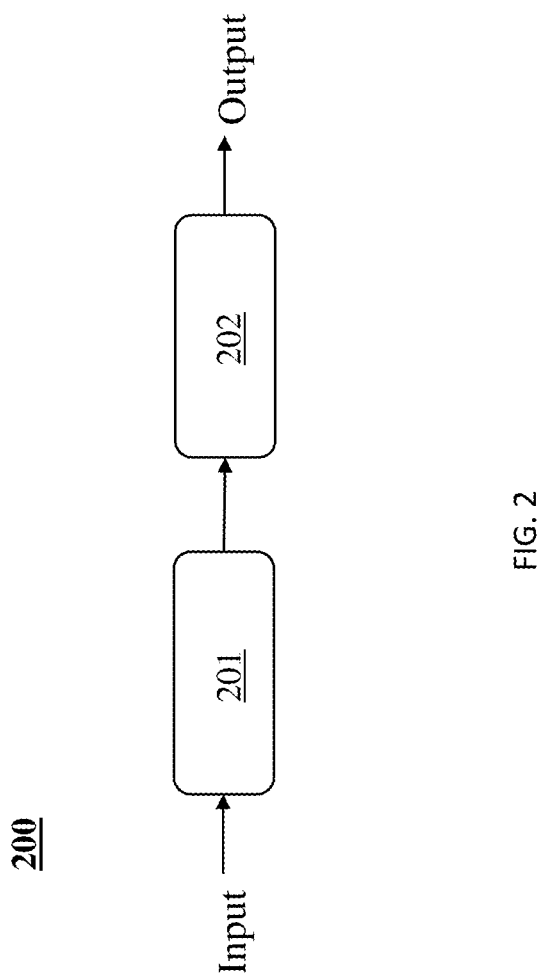
FIG. 2 shows a framework of a processor 200 for differential diagnosis of two types of neuromuscular diseases based on electrodiagnostic signals according to one embodiment of the present invention.

FIG. 2 shows a framework of a processor 200 for differential diagnosis of two types of neuromuscular diseases based on electrodiagnostic signals according to one embodiment of the present invention.

As observed in FIG. 2, the processor 200 includes a feature extractor 201 and a classifier 202 connected to the feature extractor 201. The feature extractor 201 is configured to receive electrodiagnostic signals of a patient and extract one or more features from the electrodiagnostic signals. The classifier 202 is configured to receive the extracted features and classify a neuromuscular disease for the patient based on the extracted features.

The classifier 202 may be a single layer machine-learning perceptron trained with datasets consisted of electrodiagnostic signals of patients to perform a linearly separable binary classification based a hypothesis function h(y) given by:

$$h(y) = \text{sign}\left(\sum_{k=0}^{K} w_k y_k\right),$$

where $y_0$ has a fixed value of 1, $y_1$ through $y_k$ represents different features of electrodiagnostic (such as EMG) signals, $w_0$ is a predefined threshold weight for $y_0$, $w_1$ through $w_K$ represent weights for the features $y_1$ through $y_k$ which are determined in the course of training, and K is the total number of features extracted from the electrodiagnostic signals.

In other words, the neuromuscular diseases for the patient are classified by performing a linearly separable binary classification using a single layer perceptron learning algorithm (PLA) based on the hypothesis function.

The classifier may include a plurality of multipliers configured to multiply a plurality of features with a plurality of weights respectively to obtain a plurality of weighted features; an adder configured to add the plurality of weighted features to obtain a sum of the weighted features; and one or more comparators configured to compare the sum of the weighted features against a threshold weight and classify the neuromuscular disease for the patient based on one or more comparison results.

When the two types of neuromuscular diseases to be differentiated are neuropathy and myopathy, EMG signals are selected as the electrodiagnostic signals and the features to be extracted from the EMG signals include root mean square (rms) and variance (var) of EMG signal amplitudes.

The root mean square of amplitudes of the EMG signal is expressed as:

$$\text{rms} = \sqrt{\frac{1}{N}\sum_{i=1}^{N} (x_i)^2},$$

where N and $x_i$ are the sample size and the $i^{th}$ sample value respectively.

The variance of amplitudes of the EMG signal is expressed as:

$$\text{var} = \frac{1}{N}\sum_{i=1}^{N} (x_i - \mu)^2,$$

where N, $\mu$ and $x_i$ are the sample size, sample mean and the $i^{th}$ sample value, respectively.

Root mean square of EMG signal amplitudes is selected as one of the features to be extracted for differential diagnosis between neuropathy and myopathy because neuropathy makes the EMG signal attain a relatively higher amplitude, while myopathy makes it lower. Therefore, it is expected that that there should be a consistent difference between the root mean square of neuropathy and myopathy EMG epochs (or datasets).

Variance of EMG signal amplitudes is selected as one of the features to be extracted for differential diagnosis between neuropathy and myopathy because myopathy EMG signal amplitudes have considerably small peak-to-peak values closer to the signal amplitudes' mean value, whereas neuropathy EMG signal amplitudes have sudden high peaks. Therefore, it is expected that variance of EMG signal amplitudes of myopathy patient tends to be lower than that of a neuropathy patient.

Figure 3:
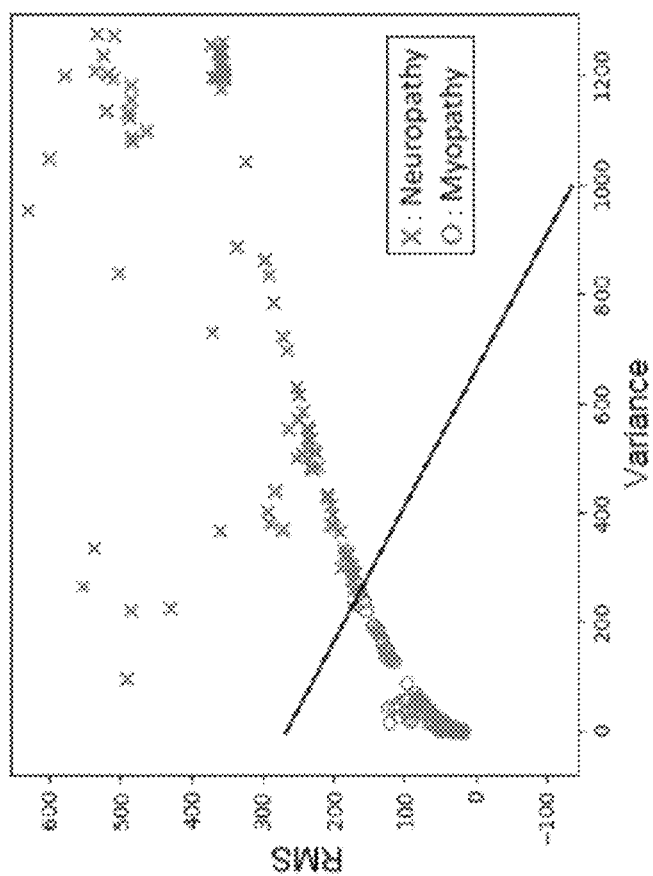
FIG. 3 visualizes neuropathy and myopathy EMG epochs as points in a two-dimensional space, considering root mean square and variance as the selected features.

FIG. 3 visualizes neuropathy and myopathy EMG epochs as points in a two-dimensional space, considering root mean square and variance as the selected features. It can be observed that the two diseases are linearly separable thus can be readily identify within a reasonable degree of accuracy. Therefore, by using a single layer PLA, the framework provided by the present invention can effectively perform the classification with minimum resource usage at the hardware level.

Figure 4:
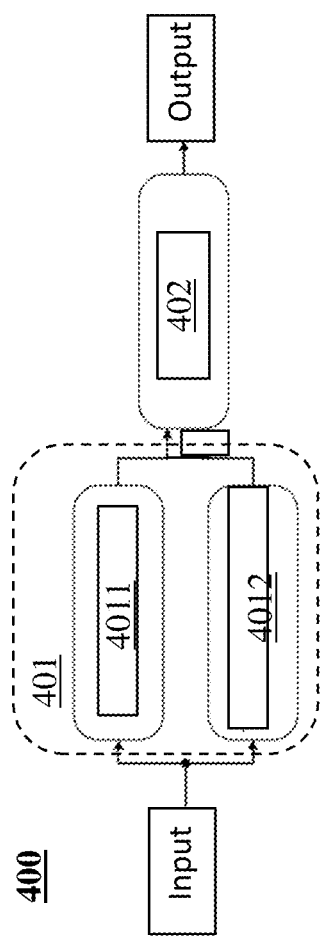
FIG. 4 shows a hardware framework of a processor for differential diagnosis between neuropathy and myopathy based on EMG signals.

FIG. 4 shows a hardware framework of a processor 400 for differential diagnosis between neuropathy and myopathy based on EMG signals. Referring to FIG. 4, the processor 400 includes a feature extractor 401 and a classifier 402. The feature extractor 401 includes a variance calculator 4011 configured to calculate variance of EMG signal amplitudes; a root mean square calculator 4012 configured to calculate root mean square of EMG signal amplitudes.

The hypothesis function $h(y)=\text{sign}(\Sigma_{k=0}^{2} w_k y_k)$ used for classification of classifying neuropathy and myopathy is configured by setting $y_0=1$, $y_1=\text{var}$, $y_2=\text{rms}$ such that the hypothesis function $h(y)=+1$ or $-1$, represents neuropathy or myopathy, respectively.

The classifier 402 is trained with datasets consisted of EMG signals of neuropathy patients and myopathy patients to obtain values of weights in the hypothesis function used for classification of classifying neuropathy and myopathy. By way of example, the datasets consisting of EMG signals from the brachial biceps are selected for training as they are commonly investigated for neuromuscular patients in general.

The trained classifier 402 is then configured to receive the calculated root mean square and variance from the feature extractor 401 and classify the neuromuscular disease for the patient as neuropathy or myopathy based on the calculated root mean square and variance.

Figure 5:
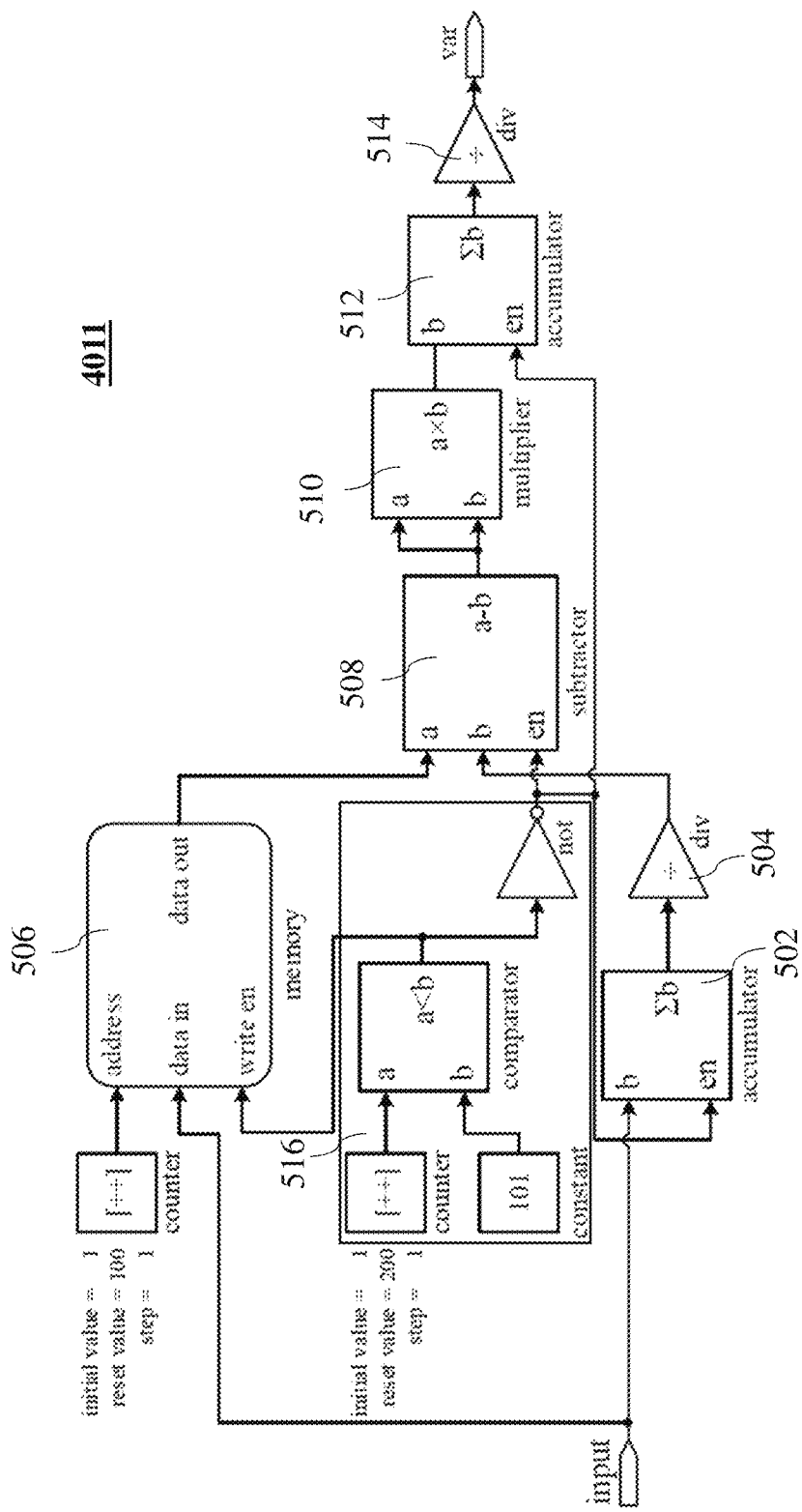
FIG. 5 depicts an exemplary circuit for implementing the variance calculator.

FIG. 5 depicts an exemplary circuit for implementing the variance calculator 4011. As observed in FIG. 5, at first, the input EMG signal amplitudes are summed using an accumulator 502 and then divided using a divider 504 over the number of signal amplitudes to get a mean of the input EMG signal amplitudes. At the same time, all input EMG signal amplitudes are saved in a memory 506. When the mean calculation is completed, subtraction is performed between the input EMG signal amplitudes provided by the memory 506 and the calculated mean using a subtractor 508. The subtracted results are squared using a multiplier 510. Then the multiplied results are summed using an accumulator 512 and then divided by a divider 514 over the number of signal amplitudes to get the variance of EMG signal amplitudes. Control enable signal for memory 506 and subtractor 508 is generated using a comparator 516.

Figure 6:
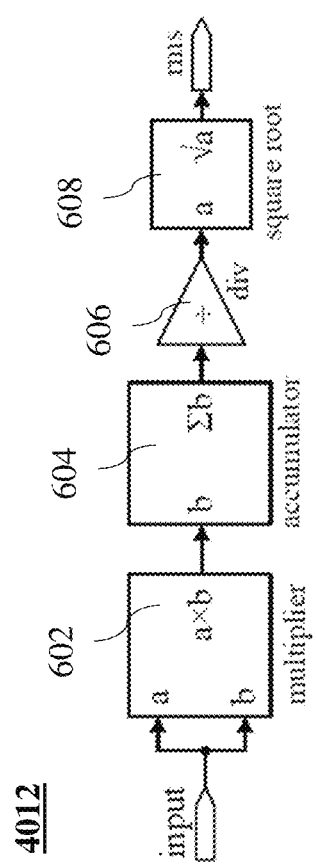
FIG. 6 depicts an exemplary circuit for implementing the root mean square calculator.

FIG. 6 depicts an exemplary circuit for implementing the root mean square calculator 4012. As observed in FIG. 6, a multiplier 602 is utilized to multiply each of the EMG signal amplitudes with itself to get the squared value. An accumulator 604 is then used to sum up all the squared values of the EMG signal amplitudes till the end of the epoch. Finally, the added result is divided over the number of signal amplitudes using a divider 606. Finally, the divided result is square-rooted using a square-root circuit 608 to get the rms of EMG signal amplitudes.

Figure 7:
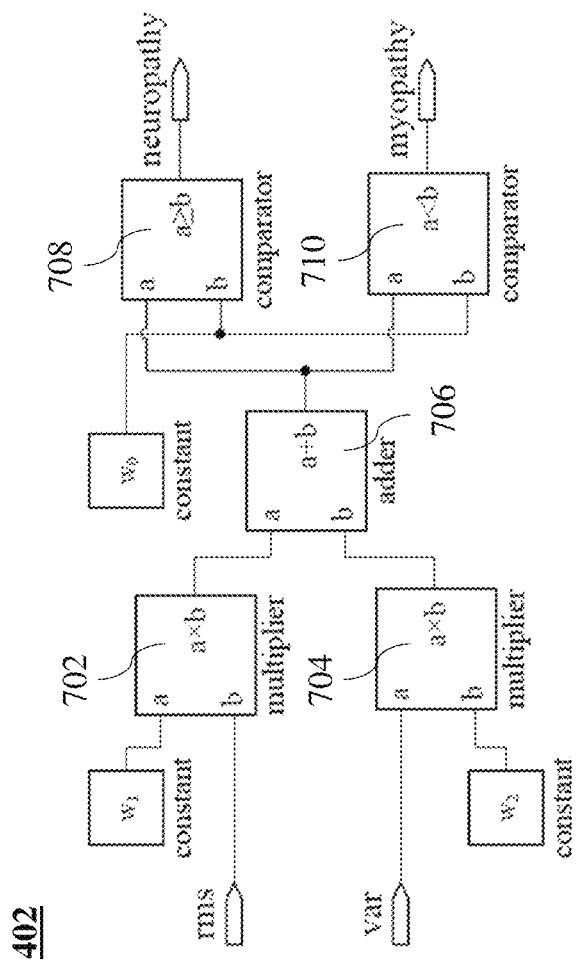
FIG. 7 depicts an exemplary circuit for implementing the classifier.

FIG. 7 depicts an exemplary circuit for implementing the classifier 402. As observed in FIG. 7, the calculated rms and variance from the feature extractor are fed as inputs of the classifier 402. At first, the inputs are multiplied with weights $w_1$ and $w_2$, using multiplier 702 and multiplier 704, respectively. Then the weighted features are added using an adder 706. The added result is subsequently compared by comparators 708 and 710 with the threshold weight, $w_0$, to classify the neuromuscular disease for the patient. For example, the classifier may be trained such that if the added result is greater than or equal to the threshold weight, the neuromuscular disease for the patient is classified as neuropathy; if the added result is smaller than the threshold weight, the neuromuscular disease for the patient is classified as myopathy.

Figure 8:
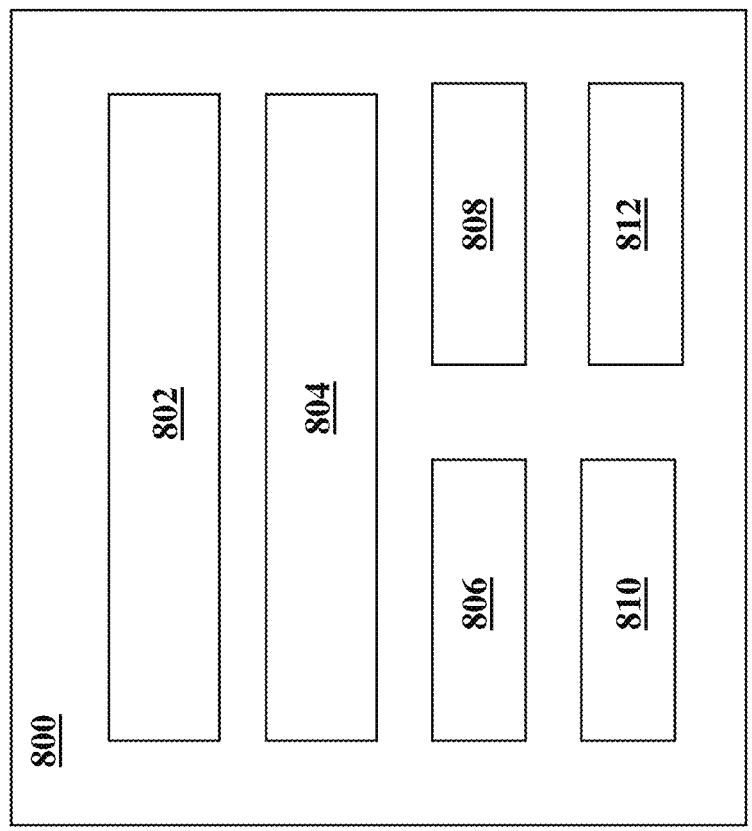
FIG. 8 is a block diagram of an exemplary point-to-care diagnosis system for differential diagnosis of two types of neuromuscular diseases based on electrodiagnostic signals according to one embodiment of the present invention.

FIG. 8 is a block diagram of an exemplary point-to-care diagnosis system 800 for differential diagnosis of two types of neuromuscular diseases based on electrodiagnostic signals according to one embodiment of the present invention. The system 800 may include at least one sensing module 802 configured for recording electrodiagnostic signals for a patient. Preferably, the sensing module 802 may be an EMG sensor configured to record EMG signals for a patient at a low and constant level of voluntary contraction using standard concentric needle electrode sensors with 2 Hz to 10 kHz band-pass filter frequency.

The system 800 may further include a processor 804 which may be a CPU, an MCU, application specific integrated circuits (ASIC), field programmable gate arrays (FPGA) or any suitable programmable logic devices configured or programmed to be a processor for differential diagnosis of two types of neuromuscular diseases based on electrodiagnostic signals according to the teachings of the present disclosure.

The device 800 may further include a memory unit 806 which may include a volatile memory unit (such as RAM), a non-volatile unit (such as ROM, EPROM, EEPROM and flash memory) or both, or any type of media or devices suitable for storing instructions, codes, and/or data.

Preferably, the system 800 may further include one or more input devices 808 such as a keyboard, a mouse, a stylus, a microphone, a tactile input device (e.g., touch sensitive screen) and/or a video input device (e.g., camera). The system 800 may further include one or more output devices 810 such as one or more displays, speakers and/or disk drives. The displays may be a liquid crystal display, a light emitting display or any other suitable display that may or may not be touch sensitive.

The system 800 may also preferably include a communication module 812 for establishing one or more communication links (not shown) with one or more other computing devices such as a server, personal computers, terminals, wireless or handheld computing devices. The communication module 812 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data.

Preferably, the sensing module 802, the processing unit 804, the memory unit 806, and optionally the input devices 808, the output devices 810, the communication module 812 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the system 800 shown in FIG. 8 is merely exemplary, and that different systems 800 may have different configurations and still be applicable in the invention.

The foregoing description of the present invention has been provided for the purposes of illustration and description. It is not intended to be exhaustive or to limit the invention to the precise forms disclosed. Many modifications and variations will be apparent to the practitioner skilled in the art.

The apparatuses and the methods in accordance to embodiments disclosed herein may be implemented using computing devices, computer processors, or electronic circuitries and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments were chosen and described in order to best explain the principles of the invention and its practical application, thereby enabling others skilled in the art to understand the invention for various embodiments and with various modifications that are suited to the particular use contemplated.

What is claimed is:

1. A point-of-care diagnosis system for differential diagnosis of neuropathy or myopathy, comprising:
    a sensing module for recording electrodiagnostic signals for a patient including a sensor configured to record an electromyogram (EMG) signal for a patient at a low and constant level of voluntary contraction, the sensing module including concentric needle electrode sensors with 2 Hz to 10 kHz band-pass filter frequency;
    a processor communicating with the sensing module for distinguishing whether the patient EMG signal indicates neuropathy or myopathy including:
    a feature extractor configured to receive the EMG signal data from the sensing module and extract one or more features from the EMG signal; and
    a classifier configured to receive the extracted features and classify the patient EMG signal as indicating neuropathy or myopathy based on the extracted features; and
    wherein the classifier is a single layer machine-learning perceptron trained with a first set of EMG signals from known neuropathy patients and a second set of EMG signals from known myopathy patients to generate weights for a hypothesis function;
    wherein the feature extractor comprises:
        a variance calculator configured to calculate a variance of the patient plurality of EMG signal amplitudes; and
        a root mean square calculator configured to calculate a root mean square of the patient EMG signal amplitudes; and
    applying the generated weights of the classifier hypothesis function to patient EMG signal amplitude variance value and amplitude root mean square value to obtain a sum of weighted features; and comparing a sum of weighted features against a threshold weight to classify the patient EMG signal as indicating either neuropathy or myopathy.

2. The point-of-care diagnosis system of claim 1, wherein hypothesis function is defined by:

$$h(y)=\text{sign}(\Sigma_{k=0}^{K} w_k y_k),$$

where h(y) is the hypothesis function, $y_0$ has a fixed value of 1, $y_1$ through $y_k$ are parameters represent the features of electrodiagnostic signals, $w_0$ is a predefined threshold weight for $y_0$, $w_1$ through $w_K$ represent weights for the features $y_1$ through $y_k$ which are determined in the course of training, and K is the total number of features extracted from the EMG signals.

3. The point-of-care diagnosis system of claim 2, wherein the classifier comprises:
   a plurality of multipliers configured to multiply a plurality of features with a plurality of weights respectively to obtain a plurality of weighted features;
   an adder configured to add the plurality of weighted features to obtain a sum of the weighted features; and
   one or more comparators configured to compare the sum of the weighted features against a threshold weight and classify the patient EMG signal as neuropathy or myopathy.

4. The point-of-care diagnosis system of claim 1, wherein the variance calculator comprises:
   a memory configured to store the plurality of EMG signal amplitudes;
   a first accumulator configured to calculate a sum of the plurality of EMG signal amplitudes;
   a first divider configured to divide the calculated sum of the plurality of EMG signal amplitudes over a total number of EMG signals to calculate a mean of the plurality of EMG signal amplitudes;
   a subtractor configured to calculate a plurality of differences, each obtained by subtracting a respective stored EMG signal amplitude with the calculated mean;
   a multiplier configured to calculate a plurality of squares of differences, each obtained by multiplying a respective calculated difference with itself;
   a second accumulator configured to calculate a sum of the plurality of squares of differences;
   a second divider configured to divide the calculated sum of the plurality of squares of differences over the total number of EMG signals to obtain the variance of the plurality of EMG signal amplitudes; and
   a comparator configured to generate control enable signals for the memory and the subtractor.

5. The point-of-care diagnosis system of claim 1, wherein the root mean square calculator comprises:
   a multiplier configured to calculate a plurality of squares of EMG signal amplitudes, each obtained by multiplying a respective EMG signal amplitude with itself;
   an accumulator configured to calculate a sum of the plurality of squares of EMG signal amplitudes;
   a divider configured to divide the calculated sum of the plurality of squares of EMG signal amplitudes over a total number of EMG signals to calculate a mean of the plurality of squares of EMG signal amplitudes; and
   a square-root circuit configured to calculate a square root of the calculated mean of the plurality of squares of EMG signal amplitudes to obtain the root mean square of the plurality of EMG signal amplitudes.

6. The point-of-care diagnosis system of claim 1, wherein the classifier comprises:
   a first multiplier configured to multiply the calculated variance of the plurality of EMG signal amplitudes with a first weight to obtain a weighted variance of the plurality of EMG signal amplitudes;
   a second multiplier configured to multiply the calculated root mean square of the plurality of EMG signal amplitudes with a second weight to obtain a weighted root mean square of the plurality of EMG signal amplitudes;
   an adder configured to add the weighted variance and the weighted root mean square to obtain a sum of the weighted variance and the weighted root mean square;
   a first comparator configured to compare the sum of the weighted variance and the weighted root mean square against a threshold weight and classify the neuromuscular disease for the patient as: neuropathy if the sum of the weighted variance and the weighted root mean square is greater than or equal to the threshold weight, or myopathy if the sum of the weighted variance and the weighted root mean square is smaller than the threshold weight.

\* \* \* \* \*